(12) United States Patent
Takahashi et al.

(10) Patent No.: US 11,090,644 B2
(45) Date of Patent: Aug. 17, 2021

(54) POROUS CARBON MATERIAL, METHOD FOR PRODUCING SAME AND USE OF SAME

(71) Applicant: Kuraray Co., Ltd., Kurashiki (JP)

(72) Inventors: Keita Takahashi, Okayama (JP);
Takayuki Yoshikawa, Okayama (JP);
Mitsunori Hitomi, Okayama (JP);
Takayuki Yamada, Okayama (JP)

(73) Assignee: KURARAY CO., LTD., Kurashiki (JP)

( * ) Notice: Subject to any disclaimer, the term of this patent is extended or adjusted under 35 U.S.C. 154(b) by 223 days.

(21) Appl. No.: 16/471,345

(22) PCT Filed: Dec. 7, 2017

(86) PCT No.: PCT/JP2017/043947
§ 371 (c)(1),
(2) Date: Jun. 19, 2019

(87) PCT Pub. No.: WO2018/116842
PCT Pub. Date: Jun. 28, 2018

(65) Prior Publication Data
US 2019/0329235 A1 Oct. 31, 2019

(30) Foreign Application Priority Data

Dec. 20, 2016 (JP) .............................. JP2016-246202

(51) Int. Cl.
| | | |
|---|---|---|
| *B01J 21/18* | (2006.01) | |
| *B01J 23/745* | (2006.01) | |
| *B01J 35/00* | (2006.01) | |
| *B01J 37/08* | (2006.01) | |
| *B01J 37/10* | (2006.01) | |
| *C01B 32/00* | (2017.01) | |
| *C01B 32/30* | (2017.01) | |
| *C01B 32/318* | (2017.01) | |
| *C01B 32/336* | (2017.01) | |
| *C02F 1/72* | (2006.01) | |
| *C02F 101/12* | (2006.01) | |
| *C02F 101/16* | (2006.01) | |

(52) U.S. Cl.
CPC ............. *B01J 37/084* (2013.01); *B01J 21/18* (2013.01); *B01J 23/745* (2013.01); *B01J 35/0033* (2013.01); *B01J 37/10* (2013.01); *C01B 32/00* (2017.08); *C01B 32/30* (2017.08); *C01B 32/318* (2017.08); *C01B 32/336* (2017.08); *C02F 1/725* (2013.01); *C01P 2006/40* (2013.01); *C02F 2101/12* (2013.01); *C02F 2101/16* (2013.01)

(58) Field of Classification Search
CPC ...... B01J 21/18; B01J 23/745; B01J 35/0033; B01J 37/084; B01J 37/10; C01B 32/00; C01B 32/30; C01B 32/318; C01B 32/336; C02F 1/725; C02F 2101/12; C02F 2101/16; C01P 2006/40
See application file for complete search history.

(56) References Cited

U.S. PATENT DOCUMENTS

| | | |
|---|---|---|
| 5,242,879 A | 9/1993 | Abe et al. |
| 5,338,462 A | 8/1994 | Abe et al. |
| 5,356,849 A | 10/1994 | Matviya et al. |
| 2003/0209497 A1 | 11/2003 | Stanley Baker et al. |
| 2003/0209498 A1 | 11/2003 | Baker et al. |
| 2004/0124152 A1 | 7/2004 | Baker |
| 2005/0167367 A1 | 8/2005 | Baker |
| 2014/0037536 A1 | 2/2014 | Reimerink-Schats et al. |
| 2017/0149070 A1 | 5/2017 | Kamai et al. |

FOREIGN PATENT DOCUMENTS

| | | |
|---|---|---|
| JP | 48-43555 | 12/1973 |
| JP | H05-811 | 1/1993 |
| JP | 2685356 B2 | 12/1997 |
| JP | 3955062 B2 | 8/2007 |
| JP | 2013-163629 A | 8/2013 |
| JP | 2014-506529 A | 3/2014 |
| WO | WO 2015/194142 A1 | 12/2015 |

OTHER PUBLICATIONS

Machine translation of JP 2013-316629 (2013) (obtained from Google Patents Apr. 2021) (Year: 2013).*
Extended European Search Report dated Jun. 23, 2020 in European Application No. 17884810.7.
International Search Report dated Feb. 13, 2018 in PCT/JP2017/043947 filed Dec. 7, 2017.

* cited by examiner

*Primary Examiner* — Lucas A Stelling
(74) *Attorney, Agent, or Firm* — Grüneberg and Myers PLLC

(57) ABSTRACT

The present invention relates to a porous carbon material having a nitrogen content of 0.5 to 2.0 mass % and an iron content of at least 400 mg/kg-porous carbon material or more, and also having an electrical conductivity of 10 S/cm or more as determined by powder resistance measurement.

11 Claims, No Drawings

POROUS CARBON MATERIAL, METHOD FOR PRODUCING SAME AND USE OF SAME

TECHNICAL FIELD

The present invention relates to a porous carbon material that can be used as a decomposition catalyst, a method for producing the same, and uses thereof.

BACKGROUND ART

It is well known that a porous carbon material itself such as activated carbon acts as a decomposition catalyst, and for example, it is known that activated carbon is useful for various oxidation reactions including oxidation of hydrogen sulfide and $SO_2$. Activated carbon has been observed as affecting such reactions and activated carbon as a catalyst only affects the reaction rate, so that the activated carbon itself hardly changes by the reaction.

Activated carbon produced from a material with a high nitrogen content effectively catalyzes a specific reaction such as decomposition of hydrogen peroxide as compared with activated carbon produced from a raw material with a low nitrogen content. Likewise, it is also known that catalytic function of activated carbon increases when activated carbon produced from a material with a low nitrogen content is exposed to a nitrogen-containing compound such as ammonia at high temperature. Recently, activated carbon with high catalytic activity has been produced by carbonizing a substance with high nitrogen content such as polyacrylonitrile and polyamide at low temperature or high temperature and activating (stimulating) the carbonized product. In either case, the activated carbon is produced by heat treatment at a temperature exceeding 700° C. It is also known that it is advantageous to oxidize activated carbon prepared from a raw material with low nitrogen content before or during exposure to a nitrogen-containing compound.

However, prior art methods of producing activated carbon with catalytic activity all have certain disadvantages, because of which overall usefulness and practicability are limited. For example, nitrogen-rich raw materials such as polyacrylonitrile and polyamide are expensive and generate large amounts of cyanides and other toxic gases upon carbonization. For activated carbon obtained from a raw material with a low nitrogen content, intense chemical post treatment is required in order to greatly change the catalytic ability. In doing so, a desired catalytic activity is achieved at the expense of carbon yield, resulting in inevitably causing an expensive cost. Furthermore, in the chemically treating method, since a large amount of toxic and dangerous chemicals such as nitric acid, sulfuric acid or ammonia is used, toxic and dangerous byproducts such as $SO_x$, $NO_x$, and cyanides are remarkably produced in a large quantity.

In Patent Literature 1, a catalytically active carbonaceous char which rapidly decomposes hydrogen peroxide has been reported. In this literature, a raw material is oxidized at low temperature, exposed to a nitrogen-containing compound such as urea, heated at high temperature in an inert atmosphere, activated at high temperature in water vapor and/or carbon dioxide, and cooled in an inert atmosphere, thereby producing a carbonaceous char. Patent Literature 2 describes that activated carbon having catalytic activity can be produced by mixing and activating charcoal with one or two or more organic nitrogen-containing compounds.

However, in the method using a nitrogen-containing compound as described in Patent Literatures 1 and 2, a large amount of toxic and dangerous by-products such as $NO_x$ is produced.

Patent Literature 3 describes a method for producing activated carbon having a catalytic activity using charcoal. This method involves the addition of ammonia to water vapor. Such addition of ammonia is undesirable from the viewpoint of both health and environment.

Patent Literature 4 describes a method for producing activated carbon using bituminous coal containing nitrogen. However, in this method, since a high temperature heat treatment is not performed, the electrical conductivity of the activated carbon is low and sufficient catalytic performance cannot be obtained. In addition, since a raw material containing excess nitrogen is used, harmful gas such as $NO_x$ is generated at the time of production, which is not desirable from the viewpoints of both health and environment.

An object of the present invention is to provide a porous carbon material which can be obtained without treatment with a nitrogen-containing compound and which can be used as a decomposition catalyst for various compounds and substances, a method for producing the same, and a use thereof.

CITATION LIST

Patent Literature

Patent Literature 1: JP 2685356 B2
Patent Literature 2: JP 2014-506529 A
Patent Literature 3: JP 3955062 B2
Patent Literature 4: JP 2013-163629 A

SUMMARY OF INVENTION

A porous carbon material according to one aspect of the present invention has a nitrogen content of 0.5 to 2.0 mass % and an iron content of at least 400 mg/kg—porous carbon material or more; and also an electrical conductivity of 10 S/cm or more as determined by powder resistance measurement.

MODE FOR CARRYING OUT THE INVENTION

As a result of intensive studies to solve the above-mentioned problems, the present inventors have found that when a porous carbon material containing a nitrogen content at a predetermined concentration or more and having a high degree of crystallinity obtained by heat treatment is used as a decomposition catalyst, the decomposing ability of peroxides such as hydrogen peroxide is greatly improved and chloramine and bromic acid and the like are effectively decomposed. The present invention has been completed by further studies based on these findings.

The porous carbon material of the present invention shows high catalytic activity as a decomposition catalyst. In addition, the porous carbon material of the present invention retains high catalytic activity even when used repeatedly. Therefore, the porous carbon material of the present invention can be used as a decomposition catalyst for various compounds and substances, and can effectively decompose peroxides (hydrogen peroxide, etc.) particularly in an aqueous solution. Further, the porous carbon material of the present invention is suitable for decomposing chloramine, bromic acid and the like.

Hereinafter, embodiments of the present invention will be described in detail, but the present invention is not limited thereto.

<Porous Carbon Material and Decomposition Catalyst>

The porous carbon material of the present invention has the following features:
(a) a nitrogen content is 0.5 to 2.0 mass %,
(b) an electrical conductivity obtained by powder resistance measurement is 10 S/cm or more, and
(c) an iron content is at least 400 mg/kg-porous carbon material or more.

When an object to be decomposed is, for example, hydrogen peroxide, a catalytic activity of the porous carbon material of the present embodiment proceeds by electron donation from a specific structural site containing nitrogen to hydrogen peroxide, and it is considered that such electron donation to hydrogen peroxide can be enhanced by increasing crystallinity to increase the electrical conductivity. Likewise, it is possible to promote the decomposition of the peroxide that decomposes by electron donation.

Furthermore, the porous carbon material of the present invention preferably has the following characteristics:
(d) benzene adsorption performance is 25 to 50%.

Regarding the above physical properties (a), (b), (c), and (d), it seems that the catalytic activity of the porous carbon material of the present embodiment is not involved in a single physical property but in a combination of these physical properties. Therefore, even if one of particularly the physical properties (a) to (c) is within the above range and the other physical properties are out of the above range, the catalytic activity of the decomposition catalyst is lowered.

If the nitrogen content of the porous carbon material is too smaller than the above defined range, reaction sites having a catalytic function decrease and the decomposition performance is lowered. On the other hand, if the nitrogen content is too large, harmful gases such as $NO_x$ generated during catalyst production are generated in large amounts, which is not preferable because there is a concern about health and environmental impact. Therefore, the nitrogen content of the porous carbon material in this embodiment is 0.5 to 2.0 mass %, more preferably 0.5 to 1.0 mass %.

If the electrical conductivity of the porous carbon material is too smaller than that stated above, an electron donating ability of the decomposition catalyst decreases and the decomposition performance decreases. Therefore, the electrical conductivity of the porous carbon material in this embodiment is 10 S/cm or more. If the electrical conductivity is within this range, the sufficient decomposition performance can be obtained, so the upper limit value is not particularly limited. However, if the electrical conductivity is too large, the electron donating ability of the decomposition catalyst improves, but the nitrogen content of the decomposition catalyst decreases, and there is a possibility that the decomposition performance of the catalyst may decrease. Therefore, the electrical conductivity of the porous carbon material in the present embodiment is preferably 10 to 20 S/cm, more preferably 12 to 18 S/cm.

If an iron content of the porous carbon material is too small than the above-mentioned specified range, it is presumed that the decomposition performance will be deteriorated since the development of the crystal structure of the decomposition catalyst becomes poor. Therefore, the iron content of the porous carbon material in this embodiment is at least 400 mg/kg-porous carbon material or more. Since sufficient decomposition performance can be obtained if the iron content is within this range, the upper limit value is not particularly limited, but if the iron content is too large, the yield of the decomposition catalyst is lowered, which is not preferable from the economical viewpoint. Therefore, the iron content of the porous carbon material in the present embodiment is preferably 400 to 5000 mg/kg-porous carbon material, more preferably 500 to 3000 mg/kg-porous carbon material. The unit of "mg/kg-porous carbon material" means an iron content (mg) per kg of porous carbon material.

When benzene adsorption performance of the porous carbon material according to the present embodiment is within the above specified range, a sufficient specific surface area can be obtained, so that excellent decomposition performance can be more reliably obtained. Although the upper limit of the benzene adsorption performance is not particularly limited, when it is too large, the yield of the decomposition catalyst decreases, which is not preferable from an economical point of view. Therefore, the benzene adsorption performance in this embodiment is preferably 25 to 50%, more preferably 30 to 45%. Note that the benzene adsorption performance in this specification refers to that measured according to JIS K 1474 (2014).

It is estimated that the catalytic activity possessed by the porous carbon material of the present embodiment proceeds by electron donation of from a specific structural site containing nitrogen to a compound to be decomposed as in the case of hydrogen peroxide. Therefore, the porous carbon material of the present embodiment is useful as a decomposition catalyst that decomposes a compound whose decomposition proceeds by electron donation. Above all, a compound which is likely to be electron donated from a specific structural site containing nitrogen is more easily decomposed.

For example, the porous carbon material of the present embodiment is very useful for decomposition of peroxide, chloramine, bromic acid, hypobromous acid, hypochlorous acid, and the like. Examples of the peroxide include inorganic peroxides (e.g. hydrogen peroxide etc.) and organic peroxides (e.g. peracetic acid etc.).

The chloramine (chloroamine) in this embodiment may be any of monochloroamine $NH_2Cl$, dichloroamine $NHCl_2$, and trichloroamine $NCl_3$. Typical chloramines commonly used for disinfecting tap water and the like are monochloroamine which has low volatility and high stability. Therefore, the remaining monochloroamine is treated with sodium thiosulfate or the like. The decomposition catalyst of the present invention efficiently decomposes such chloramine (e.g. monochloroamine etc.) to liberate chlorine.

In this embodiment, a decomposition catalyst containing the porous carbon material as described above is also included. The decomposition catalyst of this embodiment is useful for decomposing a compound whose decomposition proceeds by electron donation. Examples of such compound include peroxide, chloramine, bromic acid, hypobromous acid, hypochlorous acid and the like. In particular, the decomposition catalyst of this embodiment is useful as a decomposition catalyst for at least any one of peroxide, chloramine and bromic acid. The decomposition catalyst of this embodiment is also useful as a decomposition catalyst for peroxides and/or chloramine.

<Production Method of Porous Carbon Material>

Generally, production of a porous carbon material used as a decomposition catalyst is carried out by bringing activated carbon into contact with a nitrogen-containing compound such as ammonia or by activated carbonization from a raw material containing a large amount of nitrogen, such as polyacrylonitrile.

In the present embodiment, a decomposition catalyst having high catalytic activity can be produced at low cost by managing parameters other than nitrogen.

That is, the porous carbon material of the present embodiment can be obtained by subjecting a carbonaceous material to carbonization, heat-treating the obtained carbonized product at a temperature of 1000 to 1200° C., more preferably 1000 to 1100° C., and then activating the heat-treated product in an atmosphere of a mixed gas containing water vapor, nitrogen, and carbon dioxide at a temperature of 850 to 1000° C. In this activation treatment, the carbonized material may be partially gasified.

The carbonaceous material can be selected from all known materials, and examples thereof include plants (coconut shell, chaff, coffee grounds, wood, etc.), natural polymers (starch, cellulose, lignins, etc.), semisynthetic polymers (cellulose esters, cellulose ethers, lignin resins, etc.), synthetic polymers (phenolic resins, furan-based resins, epoxy resins, etc.), bituminous substances and the like. These raw materials can be used singly or in combination of two or more kinds thereof. The preferred raw material may be a plant material such as wood, but it is particularly preferable to use a natural mineral as a raw material. Specifically, it is preferable to use coal selected from nitrogen- and iron-containing coal, for example, coal selected from peat, lignite, subbituminous coal, bituminous coal, semi-anthracite coal, and anthracite, and among these, coal containing a large nitrogen content, such as bituminous coal, is preferred. However, it is undesirable to use bituminous coal with too much nitrogen content because such bituminous coal causes a large amount of harmful substances such as $NO_x$, which may cause health and environmental impact. Therefore, the nitrogen content of the carbonaceous raw material is desirably 1.0 to 2.0 mass %, preferably 1.5 to 2.0 mass %. In addition, if the content of iron contained as an ash content of the carbonaceous raw material (for example, bituminous coal) is too small, development of crystal structure of the porous carbon material becomes poor and high decomposition performance cannot be obtained. On the other hand, if such iron content is too large, the yield of decomposition catalyst is lowered, which is not preferable from an economical point of view. Therefore, the iron content of the carbonaceous raw material is preferably 500 to 10000 mg/kg, more preferably 500 to 2000 mg/kg.

The carbonaceous material of the present embodiment can be manufactured using a fluidized bed, a multistage furnace, a rotary furnace, or the like which is a general activated carbon production facility.

Carbonization can be carried out by a conventional method, for example, by heating a carbonaceous material at 400 to 800° C., preferably 500 to 800° C., more preferably 600 to 800° C., while blocking oxygen or air.

The heat treatment of the carbonized product can be carried out at a temperature of 1000° C. or more, preferably 1000 to 1200° C., more preferably 1000 to 1100° C., while blocking oxygen or air. If this heat treatment temperature is too low, development of crystallinity of the porous carbon material becomes poor, and sufficient electron donating ability cannot be obtained, so that decomposition performance is considered to be low. On the other hand, if the heat treatment temperature is too high, the crystallinity is increased, but nitrogen is desorbed from the carbon structure, so that sufficient decomposition performance may not be obtained.

In the manufacturing method of the present embodiment, the activation treatment can be performed by using a fluidized bed, a multistage furnace, a rotary furnace or the like for a carbonized product at a temperature of 850° C. or more, preferably 850 to 1000° C. (e.g. 850 to 950° C.) in an atmosphere of a mixture of water vapor, nitrogen and carbon dioxide. By activating in the atmosphere of the mixture, the carbonized product is partly gasified, and a porous carbon material (decomposition catalyst) is obtained. The gas (mixed gas composed of water vapor, nitrogen and carbon dioxide) for gasifying a part of the carbonized product of the carbonaceous material can be also obtained by burning other combustible materials including natural gas, petroleum, or hydrocarbon. Incidentally, the activation temperature is usually varied in the range of about ±25° C. in many cases.

The activation time is not particularly limited, but may be about 1 to 48 hours, preferably 4 to 24 hours, more preferably about 5 to 20 hours (for example, 6 to 12 hours). When the activation time is too short, the decomposition catalyst activity of the porous carbon material may decrease, and when the activation time is too long, the productivity of the porous carbon material may decrease.

Although the gas partial pressure is not particularly limited, it is preferable that the water vapor partial pressure is 7.5 to 40%, preferably 10 to 30% (for example, 10 to 20%), the carbon dioxide partial pressure is 10 to 50%, preferably 15 to 45% (for example, 20 to 40%), and the nitrogen partial pressure is about 30 to 80%, preferably about 40 to 70% (for example, 45 to 65%). Also, the gas partial pressure may be such that the water vapor partial pressure is 10 to 40%, the carbon dioxide partial pressure is 10 to 40% and the nitrogen partial pressure is about 40 to 80%. The gas total pressure is usually 1 atm (about 0.1 MPa).

Further, the total gas supply amount (flow rate) is about 1 to 50 L/min, preferably about 1 to 20 L/min, with respect to 100 g of the carbonized product raw material. When the flow rate is too small, the activation is insufficient, and when the flow rate is too much, the decomposition catalyst activity of the porous carbon material decreases.

By combining these conditions, it is considered that a porous carbon material having a desired nitrogen content, electrical conductivity and iron content can be obtained. For the details of the method for producing the porous carbon material of this embodiment, reference may be made to examples described later.

The porous carbon material obtained by the production method of the present embodiment may be in the form of powder, particulates, or granules and may be formed into a honeycomb form as needed.

<Method for Producing Molded body Containing Porous Carbon Material>

Next, a method for producing a molded body containing the porous carbon material of the present embodiment (hereinafter referred to as a porous carbon material-containing molded body) will be described. The porous carbon material-containing molded body according to this embodiment can be obtained by a production method including a slurry preparation step of preparing a slurry by dispersing a mixture obtained by mixing a particulate or powdery porous carbon material and a fibrous binder in water, a suction filtration step of filtering the slurry under suction to obtain a preform, and a drying step of drying the preform to obtain a dried molded body.

(Slurry Preparation Step)

In the slurry preparation step, a granular or powdered porous carbon material and a fibrous binder are dispersed in water so that a slurry having a solid content concentration of 0.1 to 10 mass % (particularly 1 to 5 mass %) is obtained. If the solid content concentration of the slurry is too high, the dispersion tends to become nonuniform and plaques are liable to form on the molded body. On the other hand, if the solid content concentration is too low, not only the molding time is prolonged and the productivity is lowered, but also the density of the molded body is increased and clogging due to capturing turbid components tends to occur.

(Suction Filtration Step)

In the suction filtration step, a forming mold having many holes is placed in the slurry, and shaping is carried out by filtering the slurry while sucking from the inside of the mold. As a mold for forming, for example, a conventional mold can be used, and for example, the mold described in FIG. 1 of JP 3516811 B2 can be used. As a suction method, a conventional method, for example, a suction method using a suction pump and the like can be used. Further, after suction filtration, a step of adjusting the shape of the outer surface may be performed by compressing a preform on a shaping table.

(Drying Step)

In the drying step, the preform obtained in the suction filtration step is removed from the mold and dried with a dryer or the like, thereby to be able to obtain a molded body. The drying temperature is, for example, about 100 to 150° C. (particularly about 110 to 130° C.), and the drying time is, for example, about 4 to 24 hours (especially 8 to 16 hours). If the drying temperature is too high, the fibrous binder may be denatured or melted, so that the filtration performance tends to be lowered and the strength of the molded body tends to be lowered. When the drying temperature is too low, the drying time tends to be long and drying tends to be insufficient. Further, a step of grinding (or polishing) the outer surface of the dried molded body may be performed.

The porous carbon material-containing molded body according to the present embodiment is used as, for example, a water purification filter or a filter for artificial dialysis. In the case of using the porous carbon material-containing molded body of the present embodiment as a water purification filter or an artificial dialysis filter, it is preferable to make such molded body into a cylindrical shape, and if necessary, a cap may be attached to a cylindrical top portion of the cylinder, a reinforcing material such as a NETLON pipe, a ceramic filter, a nonwoven fabric or the like may be inserted into the cylindrical hollow portion, or a nonwoven fabric may be attached to the surface. By making the molded body into a cylindrical shape, the water flow resistance can be lowered. Furthermore, when filling the molded body in the housing for use as a cartridge, it is possible to easily load and replace the cartridge in a water purifier.

<Removal Method of Peroxide and/or Chloramine>

By using the porous carbon material of the present embodiment as a decomposition catalyst, at least one of peroxide, chloramine, bromic acid, hypobromous acid and hypochlorous acid (peroxide and/or chloramine etc.) can be decomposed and removed. That is, the present invention includes a method in which at least one of peroxide, chloramine, bromic acid, hypobromous acid and hypochlorous acid is decomposed and removed from an object by using a porous carbon material as a decomposition catalyst in contact with the object, preferably a method in which peroxide and/or chloramine is decomposed and removed from the object, more preferably a method in which peroxide, chloramine and/or bromic acid is decomposed and removed from the object, and even more preferably a method in which peroxide, chloramine, bromic acid, hypobromous acid, and hypochlorous acid are decomposed and removed from the object.

The object as used herein is not particularly limited as long as it is a substance from which peroxide and/or chloramine is to be removed or it includes various media containing peroxide and/or chloramine. For example, water, flowing water, mist and the like containing peroxide and/or chloramine can be mentioned. Among these, the porous carbon material of the present embodiment is suitable for removing peroxides and/or chloramine, etc. from an object composed of a liquid medium such as water and flowing water.

The decomposition of a substrate such as the peroxide, chloramine, etc. (at least one of peroxide, chloramine, bromic acid, hypobromous acid, and hypochlorous acid) can be carried out in an aqueous solvent, and the decomposition reaction is carried out in the presence of an excess amount of solvent in many cases. The concentration of the substrate such as peroxide and chloramine is not particularly limited, and for example, the concentration of the peroxide in the reaction system may be 0.1 to 50 mass %, preferably 0.5 to 30 mass %, more preferably about 1 to 20 mass %. When using the porous carbon material of the present embodiment, the substrate can be effectively decomposed or oxidized. Thus, the porous carbon material of the present invention is useful for removing a trace amount of a substrate such as a peroxide (hydrogen peroxide, etc.) and chloramine (monochloroamine, etc.). In the case of treating the remaining trace amount of substrate, for example, the substrate concentration may be about 0.1 ppb to 1000 ppm.

The amount of the porous carbon material used as a decomposition catalyst is not particularly limited, but it is 0.1 to 500 parts by mass, preferably 1 to 250 parts by mass, more preferably 5 to 100 parts by mass (for example, about 10 to 50 parts by mass), per 100 parts by mass of a substrate such as peroxide and chloramine.

The decomposition (removal) reaction can be carried out at, for example, about 10 to 70° C., preferably about 20 to 50° C. The decomposition reaction can be carried out, for example, in air or an oxygen-containing atmosphere, or in an inert gas atmosphere.

The porous carbon material of the present embodiment can maintain high catalytic activity without decreasing catalytic activity even when used repeatedly as a decomposition catalyst. For example, in the test method described in examples (evaluation of hydrogen peroxide decomposing performance in an aqueous solution and measurement of decomposition rate of hydrogen peroxide), the decomposition rate of hydrogen peroxide per 1 g of decomposition catalyst for 1 hour in an aqueous solution in a batch system is 1000 mg-$H_2O_2$/g-porous carbon material/hr or more (for example, 2000 to 100000 mg-$H_2O_2$/g-porous carbon material/hr, preferably 3000 to 75000 mg-$H_2O_2$/g-porous carbon material/hr, more preferably from 5000 to 50000 mg-$H_2O_2$/g-porous carbon material/hr). Moreover, even when the porous carbon material is used repeatedly 15 times or more (for example, about 15 to 25 times, preferably about 15 to 30 times) in such a test method (the hydrogen peroxide decomposition test in an aqueous solution in a batch system), high catalytic activity can be maintained. That is, the porous carbon material of the present invention can be repeatedly used 15 times or more while maintaining the hydrogen peroxide decomposing performance of 1000 mg-$H_2O_2$/g-porous carbon material/hr or more in an aqueous solution in the above test method. In addition, "1000 mg-$H_2O_2$/g-porous carbon material/hr" means that 1000 mg of hydrogen peroxide ($H_2O_2$) per 1 g of porous carbon material is decomposed per hour.

Since the porous carbon material of the present embodiment is very useful as a catalyst for decomposing a peroxide and/or chloramine, for example, such porous carbon material exerts excellent effects in uses such as decomposition of a peroxide in industrial waste water and decomposition removal of chloramine contained in tap water. Therefore, the porous carbon material of the present embodiment is very useful as a decomposition catalyst, for example, for a water purifier or an industrial wastewater treatment.

Although the present specification discloses technologies of various aspects as described above, main technologies among them are summarized below.

A porous carbon material according to one aspect of the present invention has a nitrogen content of 0.5 to 2.0 mass % and an iron content of at least 400 mg/kg-porous carbon material or more; and also has an electrical conductivity of 10 S/cm or more as determined by powder resistance measurement.

With such a constitution, the porous carbon material of the present invention exhibits high catalytic activity as a decomposition catalyst and retains high catalytic activity even when used repeatedly. Therefore, the porous carbon material of the present invention is effective as a decomposition catalyst for various compounds and substances In the porous carbon material, benzene adsorption performance is preferably in a range of 25 to 50%.

Further, a molded body according to another aspect of the present invention is characterized by containing the above-described porous carbon material. The molded body can be suitably used, for example, as a water purifying filter or an artificial dialysis filter.

Furthermore, a decomposition catalyst according to another aspect of the present invention is characterized by including the above-described porous carbon material. It is also preferable that the decomposition catalyst is a decomposition catalyst for at least one of peroxides, chloramine and bromic acid.

A method for producing a porous carbon material according to a further aspect of the present invention comprises: subjecting a carbonaceous material to carbonization, heat treating the obtained carbonized product at a temperature of 1000 to 1200° C., and thereafter activating the heat-treated product at a temperature of 850 to 1000° C. in a mixed gas atmosphere containing water vapor, nitrogen and carbon dioxide.

In the method for producing a porous carbon material, it is preferable that the carbonaceous material derives from a natural mineral raw material.

Further, it is preferable that the nitrogen content of the natural mineral raw material is 1.0 to 2.0 mass %.

A method for decomposing and removing peroxides and/or chloramine and the like according to a further aspect of the present invention is characterized by a method in which the porous carbon material is used as a decomposition catalyst and brought into contact with an object, so that at least one of a peroxide, chloramine, bromic acid, hypobromous acid, and hypochlorous acid is decomposed and removed from the object.

Further, the present invention also includes a decomposition catalyst device comprising the molded body or the decomposition catalyst described above.

EXAMPLES

Hereinafter, the present invention will be described in more detail based on examples, but the following examples do not limit the present invention at all.

Test Example 1

In the following examples and comparative examples, decomposition catalyst performance of a porous carbon material was evaluated as follows.

[Measurement of Nitrogen Content of Porous Carbon Material]

After a pulverized porous carbon material was dried at 120° C. for 2 hours, a nitrogen content of the porous carbon material was measured by Vario EL III manufactured by ELEMENTAR company using sulfanilic acid as a reference material.

[Measurement of Electrical Conductivity of Porous Carbon Material]

An electrical conductivity of a porous carbon material was measured using a powder resistance measuring unit MCP-PD51 manufactured by Mitsubishi Chemical Analytech Co., Ltd. Since the particle size of a measurement specimen has a large influence on the measurement of electrical conductivity, the specimen is pulverized so that a 10% particle diameter (D10) of cumulative distribution on the volume basis of the porous carbon material is about 1 to 3 μm, a 50% particle diameter (D50) of cumulative distribution on the volume basis is about 5 to 8 μm, and a 90% particle diameter (D90) of cumulative distribution on the volume basis is about 10 to 20 μm, and then electrical conductivity of a porous carbon material pellet when a load of 12 kN was applied was measured. The particle diameter of the pulverized porous carbon material was measured by a laser diffraction measurement method. That is, the porous carbon material to be measured was placed in ion exchange water together with a surfactant, subjected to ultrasonic vibration to prepare a homogeneous dispersion, and the dispersion was measured using Microtrac MT 3300 EX-II manufactured by MicrotracBEL Corp. "Polyoxyethylene (10) octylphenyl ether" manufactured by Wako Pure Chemical Industries, Ltd. was used as the surfactant. The analysis conditions are shown below.

(Analysis Conditions)

Number of measurements: 3 times
Measurement time: 30 seconds
Distribution representation: volume
Particle size division: standard
Calculation mode: MT 3000 II
Solvent name: WATER
Measurement upper limit: 2000 μm and measurement lower limit: 0.021 μm
Residual fraction ratio: 0.00
Passing fraction ratio: 0.00
Residual fraction ratio setting: invalid
Particle transmittance: absorption
Particle refractive index: N/A
Particle shape: N/A
Solvent refractive index: 1.333
DV value: 0.0100 to 0.0500
Transmittance (TR): 0.750 to 0.920

[Measurement of Benzene Adsorption Performance of Porous Carbon Material]

Benzene adsorption performance of porous carbon materials was measured in accordance with JIS K 1474 which is an activated carbon test method in Japanese Industrial Standards.

[Measurement of Iron Content of Porous Carbon Material]

First, a calibration curve for iron content was prepared from a standard solution of known concentration. Then, after a pulverized measurement sample was dried at 120° C. for 2 hours, 0.1 g of the sample was placed in a decomposition vessel, mixed with 10 ml of nitric acid, and then dissolved with a microwave sample pretreatment apparatus (Discover SP-D80, manufactured by CEM). The solution was taken out, diluted to a volume of 25 ml to prepare a measured solution, and analyzed with an ICP emission spectroscopic analyzer (iCAP 6200, manufactured by Thermo Fisher Scientific Inc.). From the obtained value and the calibration curve prepared previously, the iron content was determined.

[Evaluation of Hydrogen Peroxide Decomposition Performance in Aqueous Solution and Measurement of Hydrogen Peroxide Decomposition Rate]

To 400 mL of an aqueous solution having a concentration of 3000 mg/L hydrogen peroxide at 25° C. was added 0.1 g of a porous carbon material which had been pulverized to a D50 of 5 to 8 μm and dried at 120° C. Then, the concentration of hydrogen peroxide remaining in the aqueous solution was measured and the change over time was evaluated until the residual amount became zero. Measurement of residual hydrogen peroxide concentration in the evaluation of decomposition performance was carried out using QUANTOFIX Peroxide manufactured by MACHEREY-NAGEL.

Hydrogen peroxide decomposition rate
$(Co-C) \times 0.4/A/T$ wherein Co is a hydrogen peroxide initial concentration (mg/L), C is a residual hydrogen peroxide concentration (mg/L) after optional time, A is an amount of a porous carbon material (g), and T is an arbitrary time (hr).

Evaluation of hydrogen peroxide decomposition performance at the time of repetition was carried out by adding a 30 mass % aqueous solution of hydrogen peroxide to a solution having a residual amount of zero of hydrogen peroxide so as to have a concentration of 3000 mg/L. The concentration of hydrogen peroxide remaining in the aqueous solution is measured again and the change over time is evaluated until the residual amount of hydrogen peroxide becomes zero. This operation was repeated until a hydrogen peroxide decomposition rate of 1000 mg-$H_2O_2$/g-porous carbon material/hr or more could not be obtained. Evaluation was performed based on the number of repetitions. In this example, the number of repetitions of 15 or more is regarded as acceptable.

Example 1

Bituminous coal (raw material nitrogen content: 1.91 mass %) was used as a carbonaceous material and subjected to carbonization at 650° C. The obtained carbonized product was heat-treated at 1100° C. Thereafter, 400 g of the heat-treated product was placed in a furnace, and a mixed gas having a water vapor partial pressure of 15%, a carbon dioxide partial pressure of 11% and a nitrogen partial pressure of 74% was introduced thereto at a total pressure of the gas of 1 atm and at a flow rate of 5.5 L/min. The mixture fed into the furnace was treated under conditions of an activation temperature of 900° C. so that the benzene adsorption performance was 20.6%, thereby to prepare a porous carbon material (decomposition catalyst). It was confirmed that the obtained decomposition catalyst had a nitrogen content, electrical conductivity, benzene adsorption performance, and iron content all within a predetermined range, and the number of repetitions as the catalyst was as high as 16 times.

Example 2

A porous carbon material (decomposition catalyst) was prepared in the same manner as in Example 1 except that bituminous coal was used as the carbonaceous raw material and subjected to activation treatment under conditions such that the benzene adsorption performance was 25.1%. It was confirmed that the obtained decomposition catalyst had a nitrogen content, electrical conductivity, benzene adsorption performance, and iron content all within a predetermined range, and the number of repetitions as the catalyst was as high as 21 times.

Example 3

A porous carbon material (decomposition catalyst) was prepared in the same manner as in Example 1 except that bituminous coal was used as the carbonaceous raw material and subjected to activation treatment under conditions such that the benzene adsorption performance was 30.8%. It was confirmed that the obtained decomposition catalyst had a nitrogen content, electrical conductivity, benzene adsorption performance, and iron content all within a predetermined range, and the number of repetitions as the catalyst was as high as 25 times.

Example 4

A porous carbon material (decomposition catalyst) was prepared in the same manner as in Example 1 except that bituminous coal was used as the carbonaceous raw material and subjected to activation treatment under conditions such that the benzene adsorption performance was 41.7%. The obtained decomposition catalyst had a nitrogen content, electrical conductivity, benzene adsorption performance, and iron content all within a predetermined range. The hydrogen peroxide decomposition performance of the obtained decomposition catalyst was evaluated, and it was found that the number of repetitions of the decomposition catalyst was 30 times because the decomposition rate of hydrogen peroxide at the 31st repetition was 800 mg-$H_2O_2$/g-porous carbon material/hr.

Example 5

A porous carbon material (decomposition catalyst) was prepared in the same manner as in Example 1 except that bituminous coal was used as the carbonaceous raw material and the heat treatment of the carbonized product was carried out at 1200° C. and the activation treatment was carried out under conditions such that the benzene adsorption performance was 29.7%. It was confirmed that the obtained decomposition catalyst had a nitrogen content, electrical conductivity, benzene adsorption performance, and iron content all within a predetermined range, and the number of repetitions as the catalyst was as high as 22 times.

Example 6

A porous carbon material (decomposition catalyst) was prepared in the same manner as in Example 1 except that bituminous coal was used as the carbonaceous raw material and the heat treatment of the carbonized product was carried out at 1000° C. and the activation treatment was carried out under conditions such that the benzene adsorption performance was 30.9%. It was confirmed that the obtained decomposition catalyst had a nitrogen content, electrical conductivity, benzene adsorption performance, and iron content all within a predetermined range, and the number of repetitions as the catalyst was as high as 23 times.

Example 7

The porous carbon material obtained in Example 4 was washed in 1N hydrochloric acid, desalted using ion exchange water, and then dried at 120° C. It was confirmed that the obtained decomposition catalyst had a nitrogen content, electrical conductivity, benzene adsorption performance, and iron content all within a predetermined range, and the number of repetitions as the catalyst was as high as 25 times.

Example 8

The porous carbon material obtained in Example 4 was washed in 0.5 N hydrochloric acid, desalted using ion exchange water, and dried at 120° C. It was confirmed that the obtained porous carbon material had a nitrogen content, electrical conductivity, benzene adsorption performance, and iron content all within a predetermined range, and the number of repetitions as the catalyst was as high as 28 times.

Example 9

A porous carbon material (decomposition catalyst) was prepared in the same manner as in Example 6 except that bituminous coal was used as the carbonaceous raw material and subjected to activation treatment under the condition such that the benzene adsorption performance was 39.4%. It was confirmed that the obtained decomposition catalyst had a nitrogen content, electrical conductivity, benzene adsorption performance, and iron content all within a predetermined range, and the number of repetitions as the catalyst was as high as 30 times.

Comparative Example 1

A porous carbonaceous material was prepared in the same manner as in Example 1 except that bituminous coal was used as the carbonaceous raw material and subjected to activation treatment under the condition such that the benzene adsorption performance was 29.5% without conducting heat treatment after carbonization. It was confirmed that the electrical conductivity of the obtained decomposition catalyst deviates from the predetermined range. The hydrogen peroxide decomposition performance of the obtained decomposition catalyst was evaluated, and it was found that the number of repetitions as the decomposition catalyst was 11 times because the decomposition rate of hydrogen peroxide at the 12th repetition was 930 mg-$H_2O_2$/g-porous carbon material/hr. It is conceivable that a factor of low decomposition performance is due to low electron donating ability of the catalyst for the reason that the electrical conductivity has not been increased.

Comparative Example 2

A porous carbon material (decomposition catalyst) was prepared in the same manner as in Example 1 except that bituminous coal was used as the carbonaceous raw material, the heat treatment of the carbonized product was carried out at 1300° C., and the activation treatment was carried out under conditions such that the benzene adsorption performance was 29.8%. It was confirmed that the obtained decomposition catalyst had a nitrogen content out of the predetermined range and the number of repetitions as the catalyst was as low as 13 times. It is thought that a factor of low decomposition performance is a small content of nitrogen contributing to the catalytic reaction.

Comparative Example 3

A porous carbon material (decomposition catalyst) was prepared in the same manner as in Example 1 except that anthracite (raw material nitrogen content: 0.72 mass %) was used as the carbonaceous raw material and subjected to activation treatment under the condition such that the benzene adsorption performance was 32.6% at an activation temperature of 950° C. without conducting heat treatment after carbonization. It was confirmed that the obtained decomposition catalyst had a nitrogen content out of the predetermined range and the number of repetitions as a catalyst was as low as 1 time. It is conceivable that a factor of low decomposition performance is a small content of nitrogen contributing to the catalytic reaction.

Comparative Example 4

A porous carbon material (decomposition catalyst) was prepared in the same manner as in Example 1 except that anthracite was used as the carbonaceous raw material and the heat treatment of the carbonized product was carried out at 1100° C. and then the activation treatment was carried out under conditions such that the benzene adsorption performance was 31.4% at an activation temperature of 950° C. It was confirmed that the obtained decomposition catalyst had a nitrogen content out of the predetermined range and the number of repetitions as the catalyst was as low as 6 times. It is conceivable that a factor of low decomposition performance is a small content of nitrogen contributing to the catalytic reaction.

Comparative Example 5

A porous carbon material (decomposition catalyst) was prepared in the same manner as in Example 1 except that a coconut shell (raw material nitrogen content: 0.30 mass %) was used as the carbonaceous raw material and subjected to activation treatment under the condition such that the benzene adsorption performance was 31.6% at an activation temperature of 950° C. without conducting heat treatment after carbonization. It was confirmed that the nitrogen content and the electrical conductivity of the obtained decomposition catalyst were out of the predetermined ranges and that the number of repetitions as the catalyst was as low as 1 time. It is conceivable that a factor of low decomposition performance is a low electron donating ability of the catalyst because of low conductivity in addition to a small content of nitrogen contributing to the catalytic reaction.

Comparative Example 6

A porous carbon material (decomposition catalyst) was prepared in the same manner as in Example 1 except that a coconut shell was used as the carbonaceous raw material and subjected to heat treatment of the carbonized product at 1100° C. and then activation treatment under the condition such that the benzene adsorption performance was 33.1% at an activation temperature of 950° C. It was confirmed that the nitrogen content and the electrical conductivity of the obtained decomposition catalyst were out of the predetermined ranges and that the number of repetitions as the catalyst was as low as 1 time. It is conceivable that a factor of low decomposition performance is a low electron donating ability of the catalyst because of low electrical conductivity in addition to a small content of nitrogen contributing to the catalytic reaction.

Comparative Example 7

Polyacrylonitrile fiber tow (PAN) (raw material nitrogen content: 26.42 mass %) was oxidized in air at 260° C. for 2 hours. The obtained oxidized fiber was subjected to staple spinning to obtain a single yarn. A fabric of the obtained single yarn was prepared, and this fabric was treated with a mixed gas having a water vapor partial pressure of 15%, a carbon dioxide partial pressure of 11% and a nitrogen partial pressure of 74% under such condition as to have a benzene adsorption performance of 31.2% at 950° C. It was confirmed that the obtained decomposition catalyst had a nitrogen content, electrical conductivity, and iron content out of the predetermined ranges and the number of repetitions as the catalyst was as low as 1 time. Since the raw material PAN does not contain iron, development of the crystal structure of the catalyst becomes poor, it is considered that the electron donation of the catalyst was low, resulting in low decomposition performance Comparative Example 8

Heat treatment was performed on the porous carbon material obtained in Example 4 under the condition of 1000° C. in a mixed gas flow of hydrogen chloride and nitrogen. Thereafter, under the condition of 600° C., removing of residual hydrochloric acid was performed for 20 minutes with a mixed gas having a water vapor partial pressure of 15%, a carbon dioxide partial pressure of 11% and a nitrogen partial pressure of 74%. It was confirmed that the obtained decomposition catalyst had an iron content out of the predetermined range and the number of repetitions as the catalyst was as low as 1 time. Although it is not clear which factor is involved in low catalytic performance, iron seems to make some contribution to catalyst performance in addition to developing crystal structure. Therefore, it is thought that such decomposition performance of the catalyst also decreases by removing most of iron.

Comparative Example 9

A porous carbon material (decomposition catalyst) was prepared in the same manner as in Example 1 except that bituminous coal was used as the carbonaceous raw material and the heat treatment of the carbonized product was carried out at 850° C. and the activation treatment was carried out under conditions such that the benzene adsorption performance was 29.6%. It was confirmed that the obtained decomposition catalyst had an electrical conductivity out of the predetermined range and the number of repetitions as the catalyst was as low as 12 times. It is conceivable, as a factor of low decomposition performance, that the electron donating ability of the catalyst is low due to the fact that electrical conductivity is not increased.

The evaluation results of the porous carbon materials obtained in Examples 1 to 9 and Comparative Examples 1 to 9 are shown in Table 1. In the table, "N" represents nitrogen.

TABLE 1

| SAMPLE No. | RAW MATERIAL | RAW MATERIAL N CONTENT (%) | HEAT TREATMENT | N CONTENT (%) | ELECTRICAL CONDUCTIVITY (S/cm) | BENZENE ADSORPTION PERFORMANCE (%) | IRON CONTENT (mg/kg-POROUS CARBON MATERIAL) | $H_2O_2$ DECOMPOSITION NUMBER OF REPETITIONS |
|---|---|---|---|---|---|---|---|---|
| EXAMPLE1 | BITUMINOUS COAL | 1.91 | 1100° C. | 0.80 | 17.00 | 20.6 | 2051.5 | 16 |
| EXAMPLE2 | BITUMINOUS COAL | 1.91 | 1100° C. | 0.76 | 16.21 | 25.1 | 2136.9 | 21 |
| EXAMPLE3 | BITUMINOUS COAL | 1.91 | 1100° C. | 0.74 | 14.91 | 30.8 | 2388.4 | 25 |
| EXAMPLE4 | BITUMINOUS COAL | 1.91 | 1100° C. | 0.70 | 12.33 | 41.7 | 2878.9 | 30 |
| EXAMPLE5 | BITUMINOUS COAL | 1.91 | 1200° C. | 0.64 | 18.37 | 29.7 | 2792.1 | 22 |
| EXAMPLE6 | BITUMINOUS COAL | 1.91 | 1000° C. | 0.83 | 12.93 | 30.9 | 2342.4 | 23 |
| EXAMPLE7 | BITUMINOUS COAL | 1.91 | 1100° C. | 0.68 | 11.17 | 40.7 | 658.4 | 25 |
| EXAMPLE8 | BITUMINOUS COAL | 1.91 | 1100° C. | 0.68 | 10.96 | 39.6 | 1387.2 | 28 |
| EXAMPLE9 | BITUMINOUS COAL | 1.91 | 1000° C. | 0.80 | 13.08 | 39.4 | 2728.2 | 30 |
| COMPARATIVE EXAMPLE1 | BITUMINOUS COAL | 1.91 | NONE | 0.74 | 9.06 | 29.5 | 2705.2 | 11 |
| COMPARATIVE EXAMPLE2 | BITUMINOUS COAL | 1.91 | 1300° C. | 0.48 | 19.28 | 29.8 | 2921.4 | 13 |
| COMPARATIVE EXAMPLE3 | ANTHRACITE | 0.72 | NONE | 0.38 | 10.28 | 32.6 | 3415.6 | 1 |
| COMPARATIVE EXAMPLE4 | ANTHRACITE | 0.72 | 1100° C. | 0.41 | 14.77 | 31.4 | 3371.1 | 6 |
| COMPARATIVE EXAMPLE5 | COCONUT SHELL | 0.3 | NONE | 0.19 | 6.01 | 31.6 | 1068.2 | 1 |
| COMPARATIVE EXAMPLE6 | COCONUT SHELL | 0.3 | 1100° C. | 0.15 | 9.61 | 33.1 | 1047.5 | 1 |
| COMPARATIVE EXAMPLE7 | PAN | 26.42 | NONE | 3.83 | 2.00 | 31.1 | 31.2 | 1 |
| COMPARATIVE EXAMPLE8 | BITUMINOUS COAL | 1.91 | 1100° C. | 0.68 | 11.09 | 40.4 | 22.1 | 1 |

TABLE 1-continued

| SAMPLE No. | RAW MATERIAL | RAW MATERIAL N CONTENT (%) | HEAT TREATMENT | N CONTENT (%) | ELECTRICAL CONDUCTIVITY (S/cm) | BENZENE ADSORPTION PERFORMANCE (%) | IRON CONTENT (mg/kg-POROUS CARBON MATERIAL) | $H_2O_2$ DECOMPOSITION NUMBER OF REPETITIONS |
|---|---|---|---|---|---|---|---|---|
| COMPARATIVE EXAMPLE9 | BITUMINOUS COAL | 1.91 | 850° C. | 0.73 | 9.21 | 29.6 | 2451.5 | 12 |

As is apparent from Table 1, in the porous carbon materials obtained in Comparative Examples 1 to 9, at least one physical property value among the nitrogen content, the electrical conductivity, the benzene adsorption performance and the iron content is excessive or too small relative to the predetermined range of the present invention. Also, the number of times of repeated use as a catalyst is 1 to 14 times, and the catalyst activity greatly decreases by repeated use.

On the other hand, in the porous carbon materials obtained in Examples 1 to 9, the nitrogen content, the conductivity, the benzene adsorption performance, and the iron content were within predetermined ranges, and the number of times of repeated use as a catalyst was improved to 15 to 30 times, revealing that the catalyst can be repeatedly used while maintaining its high catalytic activity.

It is also understood from these examples that heat treatment is important in obtaining the porous carbon material of the present invention. In comparative examples 1 and 7 in which heat treatment was not performed, although the amount of nitrogen was sufficient, the crystallinity (electrical conductivity) was lowered, resulting in inferior decomposition performance. In addition, in Comparative Example 2 in which the heat treatment temperature was too high, although the crystallinity (electrical conductivity) was high, it is thought that the amount of nitrogen decreased due to high temperature heat treatment, resulting in poor decomposition performance. In Comparative Example 9 in which the heat treatment temperature was too low, the degradation performance was inferior because the heat treatment temperature was not sufficient, and the crystallinity could not be sufficiently increased.

On the other hand, in each of examples in which the heat treatment was carried out in an appropriate temperature range, a porous carbon material excellent in decomposition performance was obtained because the amount of nitrogen was adequate and the crystallinity (electrical conductivity) was sufficient.

Test Example 2

[Decomposition of Chloramine]

Using the porous carbon materials obtained in Examples 1, 3, 4, 5, 7, and 9 and Comparative Examples 1, 2, 5, and 8, the amount of decomposition of chloramine was measured as follows.

The porous carbon material of each of the above examples or comparative examples was charged into 100 mL of an aqueous solution of chloramine (monochloroamine) adjusted to about 100 ppm while changing the addition amount, and after shaking at 25° C. for 2 hours, the porous carbon material was filtered with a filter paper and a residual chloramine concentration of the filtrate was measured by the following DPD absorption photometric method. Then, the relationship between the remaining chloramine concentration and the decomposition amount of chloramine (mg/g-porous carbon material) was calculated and the decomposition amount of chloramine (mg/g-porous carbon material) at a remaining concentration of 3 ppm was calculated and used for comparison. Note that in these examples, the case where the decomposition amount of chloramine (mg/g-porous carbon material) at a residual concentration of 3 ppm is 50 mg/g-porous carbon material was regarded as acceptable. In addition, the "mg/g-porous carbon material" means an amount (mg) of a substance to be decomposed per 1 g of the porous carbon material.

[Quantitative Determination Method of Chloramine: DPD Absorption Photometric Method]

(1) Measurement of Free Residual Chlorine

A phosphate buffer solution (2.5 mL) was taken in a 50 mL colorimetric tube with a stopper, and 0.5 g of N, N-diethyl-p-phenylenediamine (DPD) reagent was added to this buffer. Next, the filtrate obtained above was added to make a total volume 50 mL, and after admixture, an adequate amount of the colored test solution was taken in an absorption cell and the absorbance at a wavelength in the vicinity of 510 to 555 nm was measured using a photoelectric spectrophotometer to determine a free residual chlorine (mg/L) in 1 L of the sample according to a calibration curve prepared in the following (2).

(2) Preparation of Calibration Curve of Free Residual Chlorine

An adjusted standard chlorine water was diluted with water to prepare a series of dilutions having several serial dilutions. Next, absorbance was measured immediately in the same manner as in the above (1) for each dilution, and the concentration (mg/L) of each free residual chlorine was determined. A calibration curve was prepared based on each absorbance obtained above.

(3) Measurement of Residual Chlorine

About 0.5 g of potassium iodide was added to and dissolved in the color-developed solution in the above (1), and the resulting solution was left standing for about 2 minutes and then measured in the same manner as in the above (1) to determine a residual chlorine (mg/L) of the sample.

(4) Measurement of Combined Residual Chlorine (Chloramine)

The difference between the residual chlorine and the free residual chlorine was measured as a combined residual chlorine (chloramine) concentration (mg/L).

The results are shown in Table 2.

TABLE 2

| SAMPLE No. | DECOMPOSITION AMOUNT OF CHLORAMINE AT RESIDUAL CONCENTRATION OF 3 ppm (mg/g-POROUS CARBON MATERIAL) |
|---|---|
| EXAMPLE1 | 56 |
| EXAMPLE3 | 82 |
| EXAMPLE4 | 107 |
| EXAMPLE5 | 63 |
| EXAMPLE7 | 90 |
| EXAMPLE9 | 137 |

TABLE 2-continued

| SAMPLE No. | DECOMPOSITION AMOUNT OF CHLORAMINE AT RESIDUAL CONCENTRATION OF 3 ppm (mg/g-POROUS CARBON MATERIAL) |
|---|---|
| COMPARATIVE EXAMPLE1 | 38 |
| COMPARATIVE EXAMPLE2 | 40 |
| COMPARATIVE EXAMPLE5 | 8 |
| COMPARATIVE EXAMPLE8 | 28 |

From the results in Table 2, it was shown that the decomposition catalysts of Examples 1, 3, 4, 5, 7, and 9 have higher decomposition amounts of chloramine than the porous carbon materials of Comparative Examples 1, 2, 5, and 8.

Test Example 3

[Decomposition of Bromic Acid]

Using the porous carbon materials obtained in Example 9 and Comparative Example 1, a decomposition amount of bromic acid was measured as follows.

The porous carbon material of the above example or comparative example was added to 100 mL of raw water (10 ppm of bromic acid ion) in which sodium bromate was dissolved in tap water with varying addition amounts and after shaking at 25° C. for 2 hours, filtered through a filter paper. The filtrate was measured by ion chromatography analysis to determine a residual bromic acid ion concentration. Then, the relationship between the remaining bromic acid concentration and the bromic acid decomposition amount (mg/g-porous carbon material) was determined to calculate a decomposition amount of bromic acid (mg/g-porous carbon material) at a residual concentration of 1 ppm. The obtained value was used for comparison.

The results are shown in Table 3.

TABLE 3

| SAMPLE No. | DECOMPOSITION AMOUNT OF BROMIC ACID AT RESIDUAL CONCENTRATION OF 1 ppm (mg/g-POROUS CARBON MATERIAL) |
|---|---|
| EXAMPLE9 | 6 |
| COMPARATIVE EXAMPLE1 | 2 |

Test Example 4

[Decomposition of Chloramine by Porous Carbon Material-Containing Molded body]

The porous carbon material of Example 9 was pulverized to have a center particle diameter of 150 μm, and 100 parts by mass of the pulverized porous carbon material and 5.5 parts by mass of an acrylic fiber Bi-PUL/F manufactured by Japan EXLAN Co., Ltd. as a fibrous binder were dispersed in water to prepare a slurry. Next, a cylindrical nonwoven fabric was attached to a mold having a large number of pores with a diameter of 3 mm, an outer diameter of 63 mmφ, an inner shaft diameter of 36 mmφ and a height of 245 mmH, and the slurry was sucked with the mold, so that the surface was rollingly formed and dried to obtain a hollow cylindrical activated carbon molded body having an outer diameter of 63 mmφ, an inner diameter of 36 mmφ and a height of 245 mmH.

The obtained activated carbon molded body was filled in a 10-inch standard housing, and water flow evaluation was conducted under conditions of a chloramine concentration of 3 ppm, a water temperature of 20° C., a flow rate of 5 L/min, and an SV of 600/hour, thereby to be able to remove chloramine.

This application is based on Japanese Patent Application No. 2016-246202 filed on Dec. 20, 2016, the contents of which are hereby incorporated by reference into the present application.

In order to express the present invention, the present invention has been appropriately and fully described by way of embodiments with reference to specific examples and the like in the above; however, it is to be recognized that those skilled in the art can readily make modifications and/or improvements on the above-described embodiments. Therefore, it is to be interpreted that the modified modes or improved modes carried out by those skilled in the art are encompassed within the scope of the rights of the claims unless those modified modes or improved modes are at a level that departs from the scope of the rights of the claims.

INDUSTRIAL APPLICABILITY

The porous carbon material of the present invention is useful as a catalyst for decomposing peroxides (hydrogen peroxide and the like) and chloramine. In addition, since the porous carbon material can maintain a high catalytic activity, recyclability of the catalyst is high, so that decomposition catalyst waste can be reduced in quantity, and costs can be reduced as well.

The invention claimed is:

1. A porous carbon material having a nitrogen content of 0.5 to 2.0 mass % and an iron content of at least 400 mg/kg-porous carbon material or more, and
    having an electrical conductivity of 10 S/cm or more as determined by powder resistance measurement.

2. The porous carbon material according to claim 1, wherein benzene adsorption performance is in a range of 25 to 50%.

3. A molded body, comprising the porous carbon material according to claim 1.

4. A decomposition catalyst device comprising the molded body according to claim 3.

5. A decomposition catalyst comprising the porous carbon material according to claim 1.

6. A decomposition catalyst device comprising the decomposition catalyst according to claim 5.

7. The decomposition catalyst according to claim 5, which is a decomposition catalyst for at least one of a peroxide, chloramine, and bromic acid.

8. A method for producing the porous carbon material according to claim 1, the method comprising:
    carbonizing a carbonaceous material to produce a carbonized product,
    heat-treating the carbonized product at a temperature of 1000 to 1200° C., and
    activating a heat-treated product at a temperature of 850 to 1000° C. in a mixed gas atmosphere comprising water vapor, nitrogen, and carbon dioxide.

9. The method according to claim 8, wherein the carbonaceous material derives from a natural mineral raw material.

10. The method according to claim 9, wherein the natural mineral raw material has a nitrogen content of 1.0 to 2.0 mass %.

11. A method for decomposing and removing at least one of a peroxide, chloramine, bromic acid, hypobromous acid, and hypochlorous acid from an object, the method comprising:

contacting the porous carbon material according to claim 1 as a decomposition catalyst with the object.

* * * * *